US006910617B2

(12) United States Patent
Yablochnikov

(10) Patent No.: US 6,910,617 B2
(45) Date of Patent: Jun. 28, 2005

(54) METHOD FOR SECURING A YOKE TO A TUBE USING MAGNETIC PULSE WELDING TECHNIQUES

(75) Inventor: Boris A. Yablochnikov, Toledo, OH (US)

(73) Assignee: Torque-Traction Technologies, Inc., Holland, OH (US)

(*) Notice: Subject to any disclaimer, the term of this patent is extended or adjusted under 35 U.S.C. 154(b) by 146 days.

(21) Appl. No.: 10/382,108

(22) Filed: Mar. 5, 2003

(65) Prior Publication Data

US 2003/0192879 A1 Oct. 16, 2003

Related U.S. Application Data

(60) Provisional application No. 60/362,215, filed on Mar. 6, 2002.

(51) Int. Cl.$^7$ .............................................. B23K 31/00
(52) U.S. Cl. ............................................... 228/115
(58) Field of Search ............... 228/115; 219/600–607, 219/615–617

(56) References Cited

U.S. PATENT DOCUMENTS

| | | |
|---|---|---|
| 2,341,084 A | 2/1944 | Dodge |
| 2,478,890 A | 8/1949 | Barager |
| 3,092,165 A | 6/1963 | Harvey |

(Continued)

FOREIGN PATENT DOCUMENTS

FR         2450145         9/1980

OTHER PUBLICATIONS

Yablochnikov, B., "Apparatus for Magnetic Pulse Welding Large Diameter Thin–Walled Pipes", AVT. Svarka, No. 4, pp. 48–51, 58, 1983.
Kojima et al., "Effect of Collision Angle on the Result of Electromagnetic Welding of Aluminum", Transactions of the Japan Welding Society, vol. 20, No. 2, pp. 36–42, Oct. 1989.
Karpouhin et al., "Magnetic Pulse Welding", International Conference on the Joining of Materials, Helsingor, Denmark, pp. 241–245, May, 1991.
Hardwick et al., "Some More Recent Advances in Cladding Technology", Ninth Annual Conference on High Energy Reaction on Materials, Novosibirsk, Russia, pp. 271–274, Aug., 1986.
Noland et al., "High–Velocity Metal Working", Office of Technology Utilization, NASA, Washington, D.C., pp. 1–29, 179, 1967.

*Primary Examiner*—Kiley S. Stoner
(74) *Attorney, Agent, or Firm*—MacMillan, Sobanski & Todd, LLC

(57) ABSTRACT

A magnetic pulse welding operation is performed to secure first and second metallic components together, such as a yoke and a driveshaft tube in a vehicular driveshaft assembly. The yoke includes a first portion, such as a body portion, and a second portion, such as a pair of opposed yoke arms. The end of the driveshaft tube is disposed co-axially about the body portion of the yoke. An inductor axially is positioned co-axially about the overlapping portions of the end of the driveshaft tube and the body portion of the yoke. The inductor is energized to perform a magnetic pulse welding operation to secure the end of the driveshaft tube to the body portion of the yoke without generating a significant flow of air toward the inductor.

11 Claims, 7 Drawing Sheets

U.S. PATENT DOCUMENTS

| | | | |
|---|---|---|---|
| 3,214,511 A | 10/1965 | Franklin | |
| 3,417,456 A | 12/1968 | Carlson | |
| 3,520,049 A | 7/1970 | Lysenko et al. | |
| 3,528,596 A | 9/1970 | Carlson | |
| 3,961,739 A | 6/1976 | Leftheris | |
| 3,992,120 A | 11/1976 | Recker | |
| 4,067,216 A | 1/1978 | Khimenko et al. | |
| 4,129,846 A | 12/1978 | Yablochnikov | |
| 4,469,356 A | 9/1984 | Duret et al. | |
| 4,504,714 A | 3/1985 | Katzenstein | |
| 4,513,188 A | 4/1985 | Katzenstein | |
| 4,523,872 A | 6/1985 | Arena et al. | |
| 4,551,118 A | 11/1985 | Spisz | |
| 4,702,543 A | 10/1987 | Hager | |
| 4,789,094 A | 12/1988 | Chudakov | |
| 4,807,351 A | 2/1989 | Berg et al. | |
| 4,930,204 A | 6/1990 | Schurter | |
| 4,990,732 A | 2/1991 | Dudko et al. | |
| 5,222,915 A | 6/1993 | Petrzelka et al. | |
| 5,318,374 A | 6/1994 | Rumberger | |
| 5,716,276 A | 2/1998 | Mangas et al. | |
| 5,813,264 A | 9/1998 | Steingroever | |
| 5,979,694 A * | 11/1999 | Bennett et al. | 220/613 |
| 5,981,921 A | 11/1999 | Yablochnikov | |
| 6,255,631 B1 * | 7/2001 | Kichline et al. | 219/617 |
| 6,412,818 B1 * | 7/2002 | Marando | 280/781 |
| 6,449,550 B1 * | 9/2002 | Lutz et al. | 701/67 |
| 6,548,792 B1 * | 4/2003 | Durand | 219/617 |
| 6,630,649 B1 * | 10/2003 | Gafri et al. | 219/603 |
| 2002/0003159 A1 | 1/2002 | Gabbianelli et al. | |
| 2003/0048164 A1 * | 3/2003 | Sentoku | 335/306 |
| 2003/0192879 A1 * | 10/2003 | Yablochnikov | 219/617 |

* cited by examiner

METHOD FOR SECURING A YOKE TO A TUBE USING MAGNETIC PULSE WELDING TECHNIQUES

CROSS REFERENCE TO RELATED APPLICATION

This application claims the benefit of U.S. Provisional Application No. 60/362,215, filed Mar. 6, 2002, the disclosure of which is incorporated herein by reference.

BACKGROUND OF THE INVENTION

This invention relates in general to the use of magnetic pulse welding techniques to secure two metallic components together, such as a yoke and a driveshaft tube in a vehicular driveshaft assembly. In particular, this invention relates to an improved method for performing such a magnetic pulse welding operation that protects the inductor from potential damage that can result from the performance of this operation.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube having first and second end fittings (such as tube yokes) secured to the opposed ends thereof. The first end fitting forms a portion of a first universal joint, which provides a rotatable driving connection from the output shaft of the engine/transmission assembly to the driveshaft tube while accommodating a limited amount of angular misalignment between the rotational axes of these two shafts. Similarly, the second end fitting forms a portion of a second universal joint, which provides a rotatable driving connection from the driveshaft tube to the input shaft of the axle assembly while accommodating a limited amount of angular misalignment between the rotational axes of these two shafts.

In vehicular driveshaft assemblies of this general type, it is usually necessary to permanently secure the first and second end fittings to the ends of the driveshaft tube. Traditionally, conventional welding techniques have been used to permanently join the first and second end fittings to the ends of the driveshaft tube. As is well known, conventional welding techniques involve the application of heat to localized areas of two metallic members, which results in a coalescence of the two metallic members. Such conventional welding techniques may or may not be performed with the application of pressure, and may or may not include the use of a filler metal. Although conventional welding techniques have functioned satisfactorily in the past, there are some drawbacks to the use thereof in joining the first and second end fittings to the ends of the driveshaft tube. First, as noted above, conventional welding techniques involve the application of heat to localized areas of the two metallic members. This application of heat can cause undesirable distortions and weaknesses to be introduced into the metallic components. Second, while conventional welding techniques are well suited for joining components that are formed from similar metallic materials, it has been found to be somewhat more difficult to adapt them for use in joining components formed from dissimilar metallic materials. Third, conventional welding techniques are not easily adapted for joining components that have different gauge thicknesses. Inasmuch as the production of vehicular driveshaft assemblies is usually a high volume process, it would be desirable to provide an improved method for permanently joining these metallic components together in a manner that avoids the drawbacks of conventional welding techniques.

Magnetic pulse welding is an alternative process that has been proposed to secure the first and second end fittings to the opposed ends of the driveshaft tube. To accomplish this, a hollow driveshaft tube having an end portion and an end fitting having a neck portion are initially provided. The end portion of the driveshaft tube can be hollow to allow the neck portion of the end fitting to be disposed co-axially therein. Alternatively, the neck portion of the end fitting can be hollow to allow the end portion of the driveshaft tube to be disposed telescopically therein. If desired, one of the adjacent surfaces of the neck portion of the end fitting or the end portion of the driveshaft tube can be tapered at least slightly relative to the other. Regardless, an annular gap is provided between the end portion of the driveshaft tube and the neck portion of the end fitting. Then, an electrical inductor is provided concentrically about or within the co-axially overlapping portions of the driveshaft tube and the end fitting. The inductor is energized to generate a magnetic field that either collapses the outer member inwardly into engagement with the inner member or expands the inner member outwardly into engagement with the outer member. In either event, the high velocity impact of the two members, as well as the large pressure exerted thereon, cause them to become permanently joined together. When one of the adjacent surfaces is tapered, the energization of the inductor causes the two members to collide one another in an axially progressive manner from one end of the tapered surface to the other. This slanting type of collision is one of the physical conditions that is usually necessary to achieve a strong, high-quality weld in the process of magnetic pulse welding.

As mentioned above, prior to being joined together, the two components are initially spaced apart from one another such that an annular gap exists between the adjacent surfaces thereof. This gap typically filled with air. Also, the adjacent surfaces of the two components are usually covered with oxide films or other contaminants. To achieve a strong weld between the two components using magnetic pulse welding (or, for that matter, any other type of cold welding process), it is important to remove these films and contaminants from the adjacent surfaces of the two components.

When the inductor is energized to form the pulsed magnetic field, the high velocity movement between the two components rapidly closes the annular gap, causing the air that was initially present in the gap to be quickly expelled outwardly therefrom. In the area where the surfaces collide with high velocity at a tapered angle, a circular cumulative flow of air is created. Fortunately, during this expulsion of the air from the annular gap, a very effective cleaning process occurs automatically as a result of the slanting collision of the adjacent surfaces of the two components to be welded. Specifically, the circular cumulative flow of air functions to remove the oxide films and other contaminants from the adjacent surfaces of the two components functions to clean such surfaces directly before the welding process occurs, which is the best type of cleaning.

This cumulative flow of air and contaminants possesses a large amount of energy and supersonic velocity. For example, it creates a loud sound like thunder if the flow is allowed to escape to the atmosphere. If the cumulative flow is reflected from an obstacle, such as a shoulder formed on the end fitting or one or more surfaces of tooling for performing the magnetic pulse welding operation, it can be directed toward the inductor that generated the magnetic field. In this instance, the insulation and other elements of the inductor can be contaminated and otherwise adversely affected in a short number of welding cycles. For example, insulation provided on the inductor can degrade significantly fast if the air and other portions of the cumulative flow are captured inside a closed space, the volume of which decreases fast. This situation is typical when, for example, the yoke shoulder is used as a stop to facilitate pre-assembly of the parts to be welded inside the inductor. In this case, a very powerful secondary flow is created as a result of a gas breakdown at the end of the collision of the welded parts through a very narrow circular gap between the shoulder and the end of the tube. Similar to the cumulative flow, this secondary flow is circular, has high velocity, and has high temperature. Unlike the cumulative flow, which is directed axially, the secondary flow is directed radially, i.e., perpendicular to the inductor insulation. The secondary flow is highly concentrated in an axial direction and acts as a sharp circular razor. The secondary flow can literally cut the inductor insulation within several welding cycles. Obviously, this is unacceptable in a manufacturing process because breakdown of the inductor is possible.

In order to prevent this from occurring, it has been suggested to provide a nonmetallic, annular shield between the axially overlapping portions of the two components and the inductor during the magnetic pulse welding process. The high velocity secondary flow created during the magnetic pulse welding operation impinges upon the shield, thus protecting the inductor therefrom premature. However, the use of such a shield has been found to be relatively time-consuming and, therefore, relatively inefficient, particularly in the context of the high volume production process associated with the manufacture of vehicular driveshaft assemblies. Thus, it would be desirable to provide an improved method for performing a magnetic pulse welding operation that reduces or eliminates the possibility of the cumulative flow escaping, as well as the possibility of forming a secondary flow in the direction of the inductor, thereby protecting the inductor from the potential wear and damage that breakdown can result therefrom.

SUMMARY OF THE INVENTION

This invention relates to an improved method for performing a magnetic pulse welding operation to secure two metallic components together, such as a yoke and a driveshaft tube in a vehicular driveshaft assembly, that protects the inductor from potential damage that can result from the performance of this operation. The yoke includes a first portion, such as a body portion, and a second portion, such as a pair of opposed yoke arms. The end of the driveshaft tube is disposed co-axially about the body portion of the yoke. An inductor axially is positioned co-axially about the overlapping portions of the end of the driveshaft tube and the body portion of the yoke. The inductor is energized to perform a magnetic pulse welding operation to secure the end of the driveshaft tube to the body portion of the yoke without generating a significant flow of air toward the inductor. To accomplish this, the yoke can be formed having an annular shoulder, and the end of the driveshaft tube can be urged into abutment with the shoulder to define an annular space therebetween. If desired, the yoke can also include an annular step, and the end of the driveshaft tube can extend about the annular step so as to define the annular space. Alternatively, the yoke can be formed having an annular shoulder, and the end of the driveshaft tube can extend about the annular shoulder to define an annular space therebetween.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
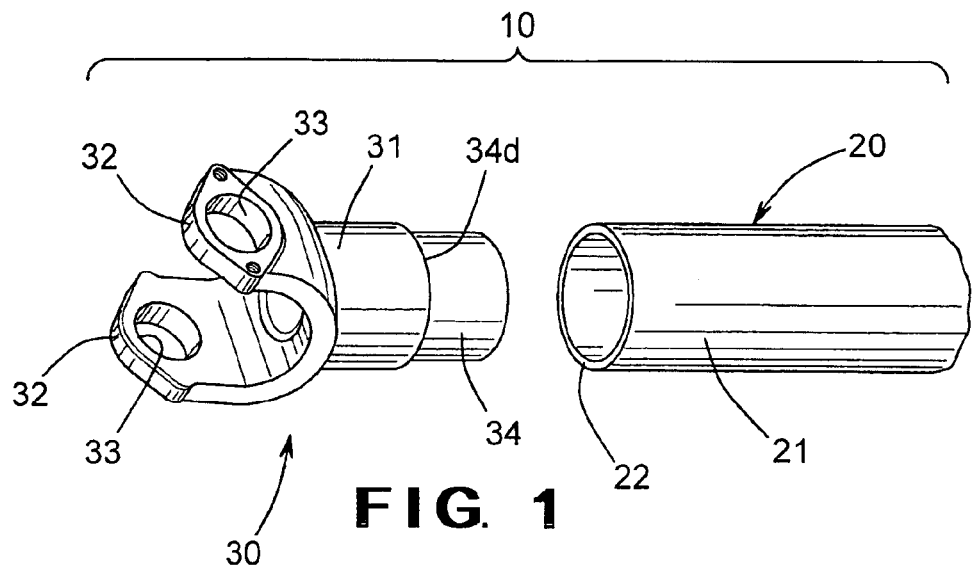
FIG. 1 is an exploded perspective view of a first embodiment of an end fitting and a driveshaft tube shown prior to being assembled and secured together by means of a magnetic pulse welding operation in accordance with the method of this invention.
Figure 2:
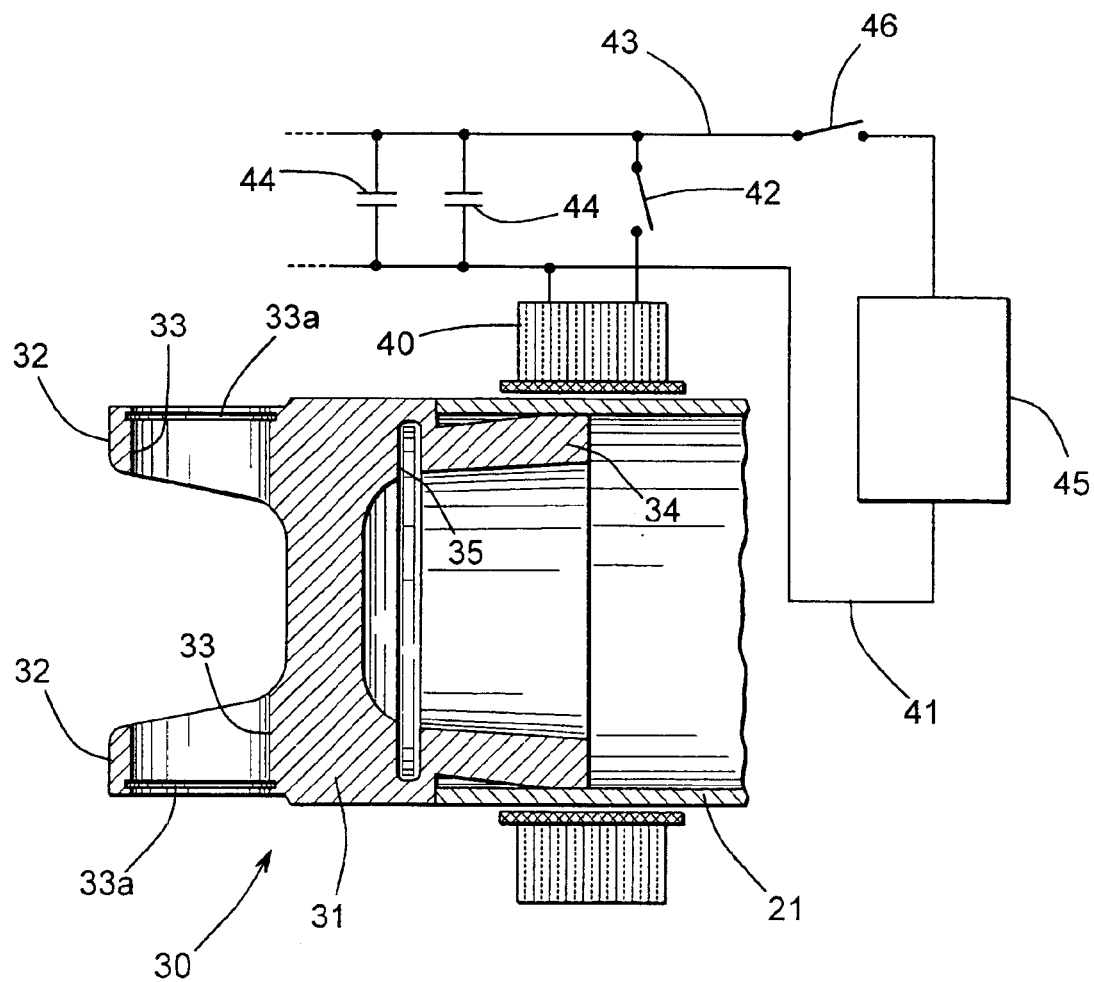
FIG. 2 is an enlarged sectional elevational view of the first embodiment of the end fitting and the driveshaft tube illustrated in FIG. 1 shown assembled and disposed within an inductor for performing the magnetic pulse welding operation.

Referring now to the drawings, there is illustrated in FIGS. 1 and 2 a portion of a vehicular driveshaft assembly 10 that includes a driveshaft tube, indicated generally at 20, and a first embodiment of an end fitting, indicated generally at 30. Although this invention will be described and illustrated in the context of securing an end fitting to a driveshaft tube to form a portion of a vehicular driveshaft assembly, it will be appreciated that the method of this invention can be used to secure any two metallic components together for any desired purpose or application.

The illustrated driveshaft tube 20 is generally hollow and cylindrical in shape and can be formed from any desired metallic material, such as 6061 T6 aluminum alloy, for example. Preferably, the driveshaft tube 20 has an outer surface that defines a substantially constant outer diameter and an inner surface that defines a substantially constant inner diameter. Thus, the illustrated driveshaft tube 20 has a substantially cylindrical and uniform wall thickness, although such is not required. The driveshaft tube 20 has an end portion 21 that terminates at an end surface 22.

The illustrated end fitting 30 is a tube yoke formed from a metallic material that can be either the same as or different from the metallic material used to form the driveshaft tube 20, such steel or an alloy of aluminum, for example. The end fitting 30 includes a body portion 31 having a pair of opposed yoke arms 32 that extend therefrom in a first axial direction. A pair of aligned openings 33 are formed through the yoke arms 32 and are adapted to receive conventional bearing cups (not shown) of a universal joint cross therein. If desired, an annular groove 33a (see FIG. 2) can be formed within each of the openings 33 to facilitate retention of the bearing cups therein in a known manner by means of respective snap rings (not shown). A generally hollow neck portion 34 extends axially in a second axial direction from the body portion 31. The structure of the neck portion 34 is described in detail below. If desired, an annular groove 35 (see FIG. 2) or similar recessed area can be formed on the interior of the end fitting 30. The purpose for this annular groove 35 is explained in detail in co-pending application Ser. No. 60/362,150, filed Mar. 6, 2002, which is also owned by the assignee of this invention. The disclosure of that application is also incorporated herein by reference.

Figure 3:
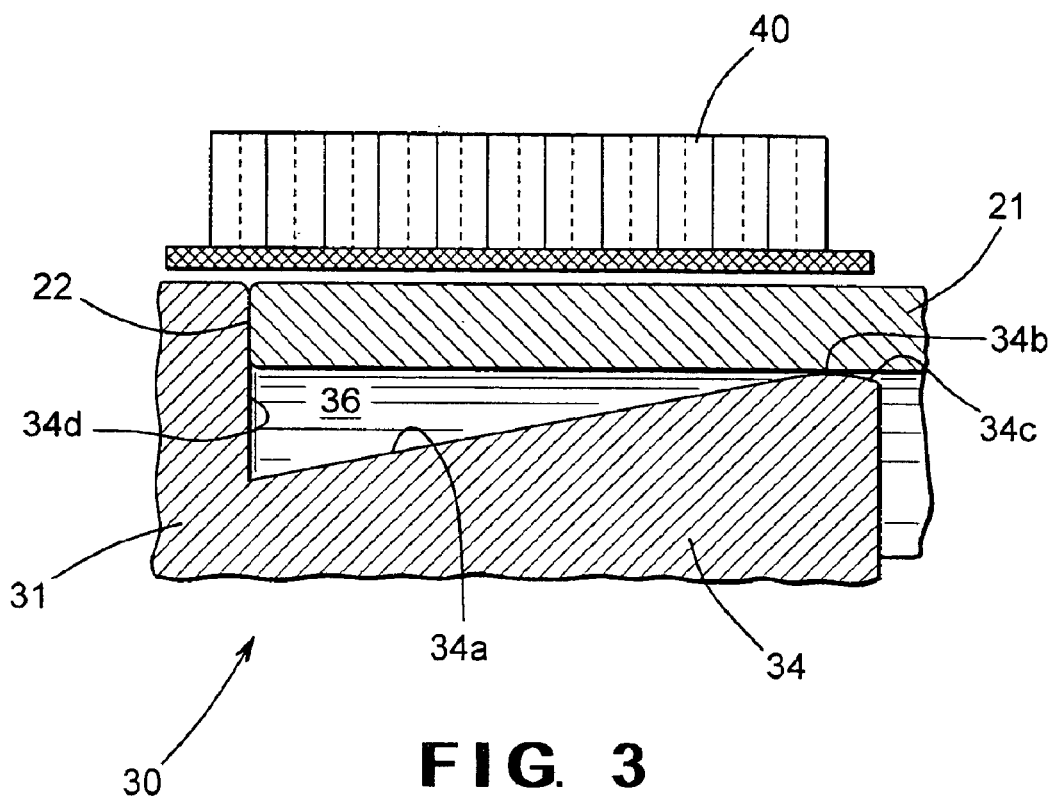
FIG. 3 is a further enlarged sectional elevational view showing portions of the first embodiment of the end fitting, the driveshaft tube, and the inductor illustrated in FIGS. 1 and 2 prior to the commencement of the magnetic pulse welding operation.

FIG. 3 illustrates the structure of the neck portion 34 of the end fitting 30 in more detail, albeit in a somewhat exaggerated manner. As shown therein, the neck portion 34 of the end fitting 30 preferably has an outer surface including a first tapered portion 34a that tapers outwardly from a relatively small outer diameter adjacent to the body portion 31 to an outermost point 34b. The outer surface of the neck portion 34 further includes a second tapered portion 34c that tapers inwardly from the outermost point 34b to the axial end of the neck portion 34. The outer surface of the neck portion 34 is preferably smaller in diameter than the outer diameter of the body portion 31. As a result, an annular shoulder 34d is defined between the neck portion 34 and the body portion 31 of the end fitting 30.

The outermost point 34b of the neck portion 34 can, if desired, define an outer diameter that is either approximately equal to or slightly smaller in diameter than the inner diameter defined by the inner surface of the end portion 21 of the driveshaft tube 20. Thus, when the end portion 21 of the driveshaft tube 20 is disposed about the neck portion 34 of the end fitting 30 as shown in FIGS. 2 and 3, the two components are positively located relative to one another. However, the outer diameter defined by the outermost point 34b of the neck portion 34 can, if desired, be somewhat smaller in diameter than the inner diameter defined by the inner surface of the end portion 21 of the driveshaft tube 20. In such instance, an external fixture (not shown) may be provided for positively positioning the end portion 21 of the driveshaft tube 20 and the neck portion 34 of the end fitting 30 relative to one another. The second tapered portion 34c of the outer surface of the neck portion 34 is provided to facilitate the axial installation of the end portion 21 of the driveshaft tube 20 onto the neck portion 34 of the end fitting 30 in an known manner. The hollow neck portion 34 of the end fitting 30 may have a substantially uniform wall thickness, although such is not required. This tapered outer surface of the neck portion 34a of the end fitting 30 has been found to provide good results during the performance of a magnetic welding process that is discussed in detail below. A more detailed explanation of the structure of the neck portion 34 of the end fitting 30 can be found in U.S. Pat. No. 5,981,921 to Yablochnikov. The disclosure of that patent is incorporated herein by reference.

Typically, the end portion 21 of the driveshaft tube 20 is installed onto the neck portion 34 of the end fitting 30 by moving it axially thereover until the end surface 22 of the driveshaft tube 20 abuts the shoulder 34d on the end fitting 30 as shown in FIGS. 2 and 3, although such is not required. When the driveshaft tube 20 and the end fitting 30 are assembled in this manner, an annular gap or space 36 (see FIG. 3) is defined between the inner surface of the end portion 21 of the driveshaft tube 20 and outer surface of the neck portion 34 of the end fitting 30. The size of the gap 36 can vary in radial dimension with the tapered shape of the outer surface of the neck portion 34 of the end fitting 30, although such is not required. Typically, the radial dimension of such gap 36 will be up to a maximum of about five millimeters, although the gap 36 may have any desired dimension. Preferably, the gap 36 is substantially uniform circumferentially about the axially overlapping portions of the end portion 21 of the driveshaft tube 20 and the neck portion 34 of the end fitting 30, although such is not required.

FIG. 2 also illustrates an inductor 40 disposed about the assembly of the driveshaft tube 20 and the first embodiment of the end fitting 30 prior to the performance of a magnetic pulse welding operation for securing the two components together in accordance with the method of this invention. The inductor 40 can be formed having any desired structure, such as that shown and described in U.S. Pat. No. 4,129,846 to Yablochnikov. The disclosure of that patent is incorporated herein by reference. The inductor 40 is connected to a schematically illustrated control circuit for selectively operating same. As shown in FIG. 2, a first end of the inductor 40 is connected to a first electrical conductor 41, while a second end of the inductor 40 is connected through a discharge switch 42 to a second electrical conductor 43. A plurality of high voltage capacitors 44 or similar energy storage devices are connected between the first and second electrical conductors 41 and 43. The first electrical conductor 41 is also connected to a source of electrical energy 45, while the second electrical conductor 43 is connected through a charging switch 46 to the source of electrical energy 45. The structure and operation of the control circuit is described in detail in U.S. Pat. No. 5,981,921 to Yablochnikov, and the disclosure of that patent is also incorporated herein by reference.

The operation of the inductor 40 to perform the magnetic pulse welding operation is well known in the art, and reference is again made to the above-referenced U.S. Pat. No. 5,981,921 to Yablochnikov for a detailed explanation. Briefly, however, the inductor 40 is operated by initially opening the discharge switch 42 and closing the charging switch 46. This allows electrical energy to be transferred from the source of electrical energy 45 to each of the capacitors 44. When the capacitors 44 have been charged to a predetermined voltage, the charging switch 46 is opened. Thereafter, when it is desired to operate the inductor 40, the discharge switch 42 is closed. As a result, a high energy pulse of electrical current flows from the capacitors 44 through the inductor 40, thereby generating an immense and momentary electromagnetic field about the end portion 21 of the driveshaft tube 20.

Figure 4:
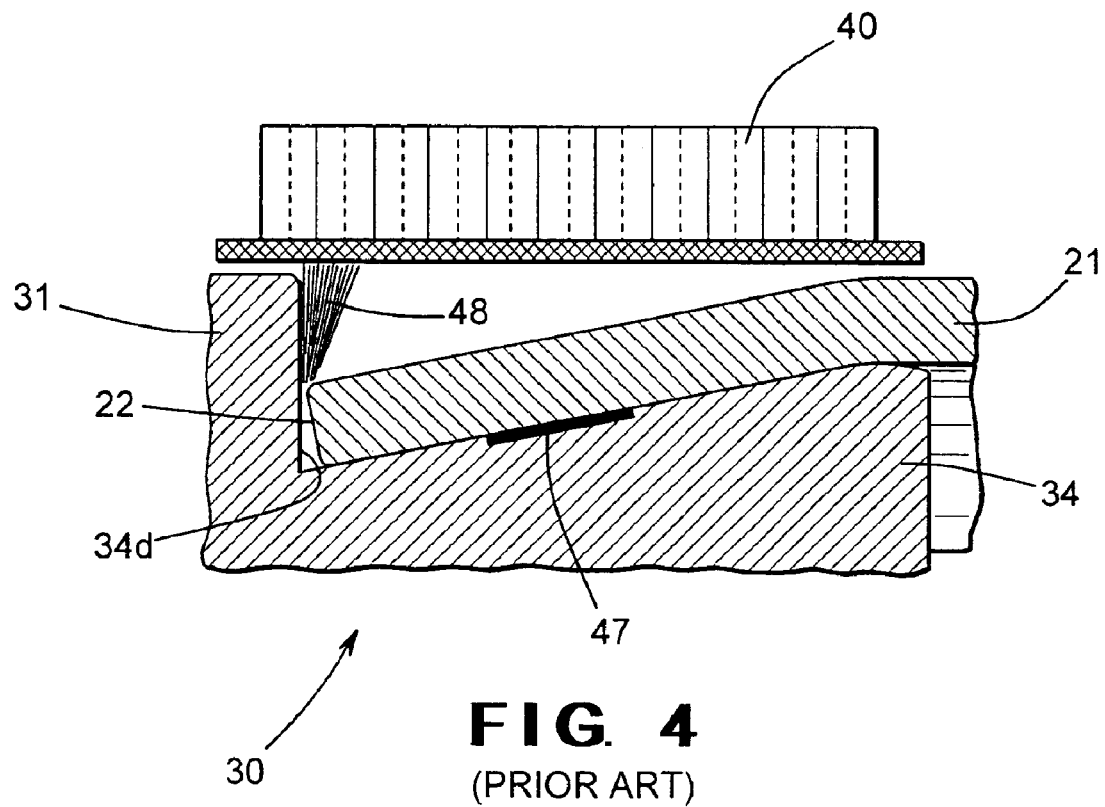
FIG. 4 is an enlarged sectional elevational view similar to FIG. 3 showing portions of the first embodiment of the end fitting, the driveshaft tube, and the inductor after the performance of a conventional magnetic pulse welding operation that results in the generation of a highly intensive gas spray that can damage the inductor.

This electromagnetic field exerts a very large force on the outer surface of the end portion 21 of the driveshaft tube 20, causing it to collapse inwardly at a high velocity onto the neck portion 34 of the end fitting 30, as shown in FIG. 4. The resulting impact of the inner surface of the end portion 21 of the driveshaft tube 20 with the outer surface of the neck portion 34 of the end fitting 30 causes a weld or molecular bond to occur therebetween, such as shown at the region 47 in FIG. 4. The size and location of the weld region 47 will vary with a variety of factors, such as the size of the gap 36, the size, shape, and nature of the metallic materials used to form the driveshaft tube 20 and the end fitting 30, the size and shape of the inductor 40, the angle and velocity of the impact between the end portion 21 of the driveshaft tube 20 and the neck portion 34 of the end fitting 30, and the like. It will be appreciated that the illustrated weld region 47 is intended to be representative of an exemplary prime welding area that provides the best possible adherence of the driveshaft tube 20 to the end fitting 30, and that other areas of the driveshaft tube 20 and the end fitting 30 may also be welded together as well during this process.

Prior to the energization of the inductor 40 to perform a magnetic pulse welding operation, the annular gap 36 between the inner surface of the driveshaft tube 20 and the outer surface of the end fitting 30 is typically filled with air. Also, the adjacent inner surface of the driveshaft tube 20 and the outer surface of the end fitting 30 are usually covered with oxide films or other contaminants. To achieve a strong weld between these two components using magnetic pulse welding (or, for that matter, any other type of cold welding process), it is important to remove these films and contaminants from the adjacent surfaces. When the inductor 40 is energized to form the pulsed electromagnetic field as described above, the inner surface of the driveshaft tube 20 and the outer surface of the end fitting 30 engage one another at a relatively high velocity. This high velocity relative movement rapidly closes the annular gap 36, causing the air and the rest of the cumulative flow to be captured inside a closed space, the volume of which decreases rapidly and, therefore, becomes relatively small, such as shown in FIG. 4. As a result, a high velocity, high temperature secondary flow, such as shown at 48 in FIG. 4, can be sprayed generally radially outwardly from between the driveshaft tube 20 and the end fitting 30 during the magnetic pulse welding operation. Because the inductor 40 is typically disposed in a relatively close proximity about the driveshaft tube 20 and the end fitting 30 during the magnetic pulse welding operation, this secondary flow 48 may impinge upon the inner surface of the inductor 40. As a result, the inductor 40 can suffer premature wear and damage.

Figure 5:
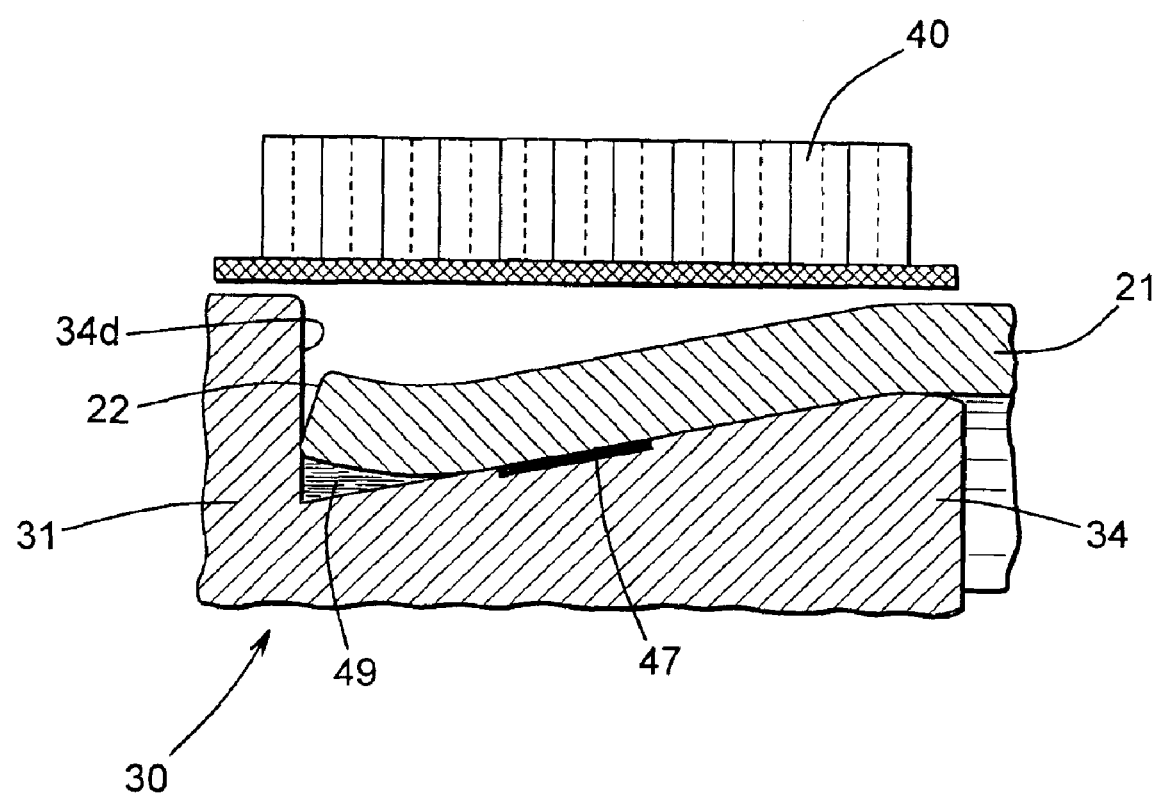
FIG. 5 is an enlarged sectional elevational view similar to FIG. 4 showing portions of the first embodiment of the end fitting, the driveshaft tube, and the inductor after the performance of a magnetic pulse welding operation that reduces or eliminates the generation of the intensive spray of air in accordance with the method of this invention.

This invention contemplates several alternative methods for reducing or eliminating the occurrence of this high velocity secondary flow 48 so as to protect the inductor 40 from premature wear and damage during the performance of the magnetic pulse welding operation. FIG. 5 illustrates the driveshaft tube 20 and the first embodiment of the end fitting 30 after the inductor 40 has been energized in the manner described above to perform a magnetic pulse welding operation in accordance with the method of this invention. As shown therein, the end surface 22 of the driveshaft tube 20 has been collapsed into engagement with a portion of the shoulder 34d of the end fitting 30, while the remainder of the end portion 21 of the driveshaft tube 20 has been collapsed into engagement with the outer surface of the neck portion 34 of the end fitting 30 as described above. As a result, the air that was present in the gap 36 before the commencement of the magnetic pulse welding operation and the rest of the cumulative flow are captured, either partially or completely, in an annular space 49 defined between the inner surface of the end portion 21 of the driveshaft tube 20, the outer surface of the neck portion 34 of the end fitting 30, and the interior portion of the shoulder 34d of the end fitting 30. The air and particles of matter contained in the annular space 49 are, therefore, not rapidly expelled (or at least not as rapidly expelled) from the gap 36 during the magnetic pulse welding operation in the manner of the high velocity secondary flow 48 described above. Thus, the air and particles of matter contained in the annular space 49 will not damage the inductor 40 as previously discussed. The end surface 22 of the driveshaft tube 20 can be caused to collapse into engaged with the shoulder 34d of the end fitting 30 by urging the end fitting 30 axially into engagement with such shoulder 34d prior to and during the magnetic pulse welding operation or in any other desired manner.

Figure 6:
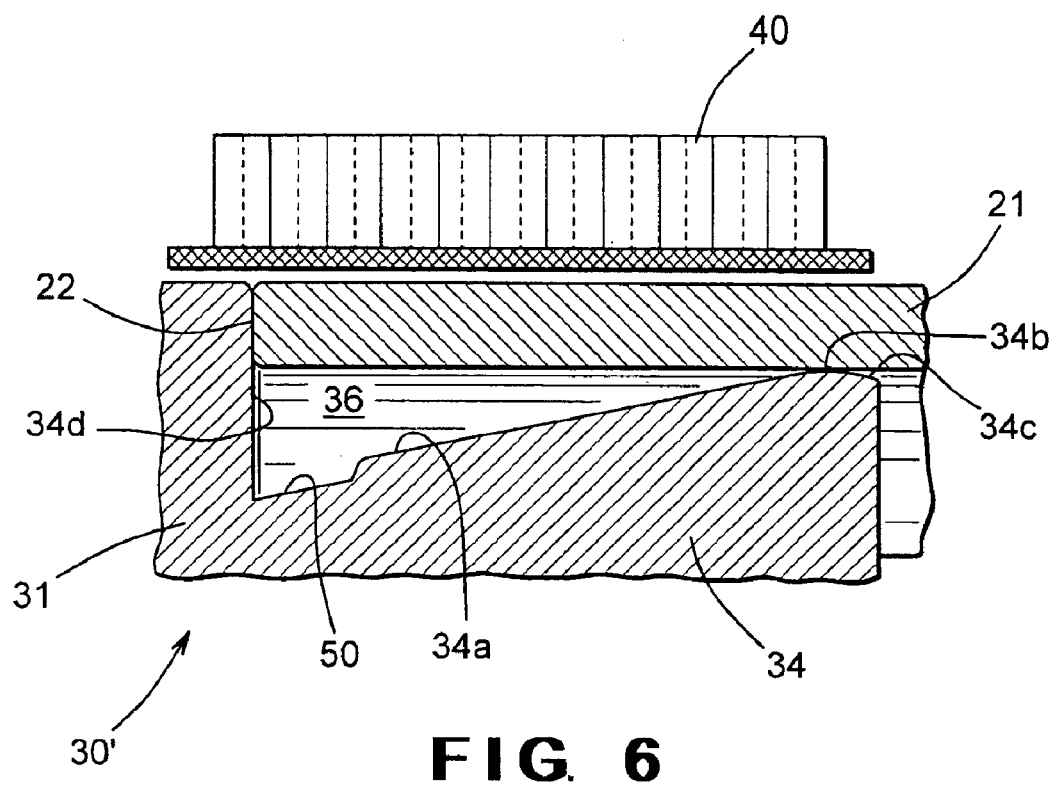
FIG. 6 is an enlarged sectional elevational view similar to FIG. 3 showing portions of a second embodiment of the end fitting, the driveshaft tube, and the inductor prior to the commencement of the magnetic pulse welding operation in accordance with the method of this invention.

FIG. 6 is an enlarged sectional elevational view similar to FIG. 3 showing a second embodiment of the end fitting, indicated generally at 30', that can be used in the method of this invention. The second embodiment of the end fitting 30' is generally similar to the first embodiment of the end fitting 30 described above, and like reference numbers are used to illustrate similar structures therein. However, the neck portion 34 of the modified end fitting 30' has a recess 50 formed in the outer surface thereof. In the illustrated embodiment, the recess 50 is annular in shape, extending about the entire outer surface of the neck portion 34. However, the recess 50 need not extend about the entire outer surface of the neck portion 34, but rather may extend about only a portion thereof. Furthermore, a plurality of individual recesses 50 may be provided on the outer surface of the neck portion 34 if desired. In the illustrated embodiment, the recess 50 is formed in the outer surface of the neck portion 34 adjacent to the shoulder 34d. However, the recess 50 may be formed at any desired location in the outer surface of the neck portion 34.

Figure 7:
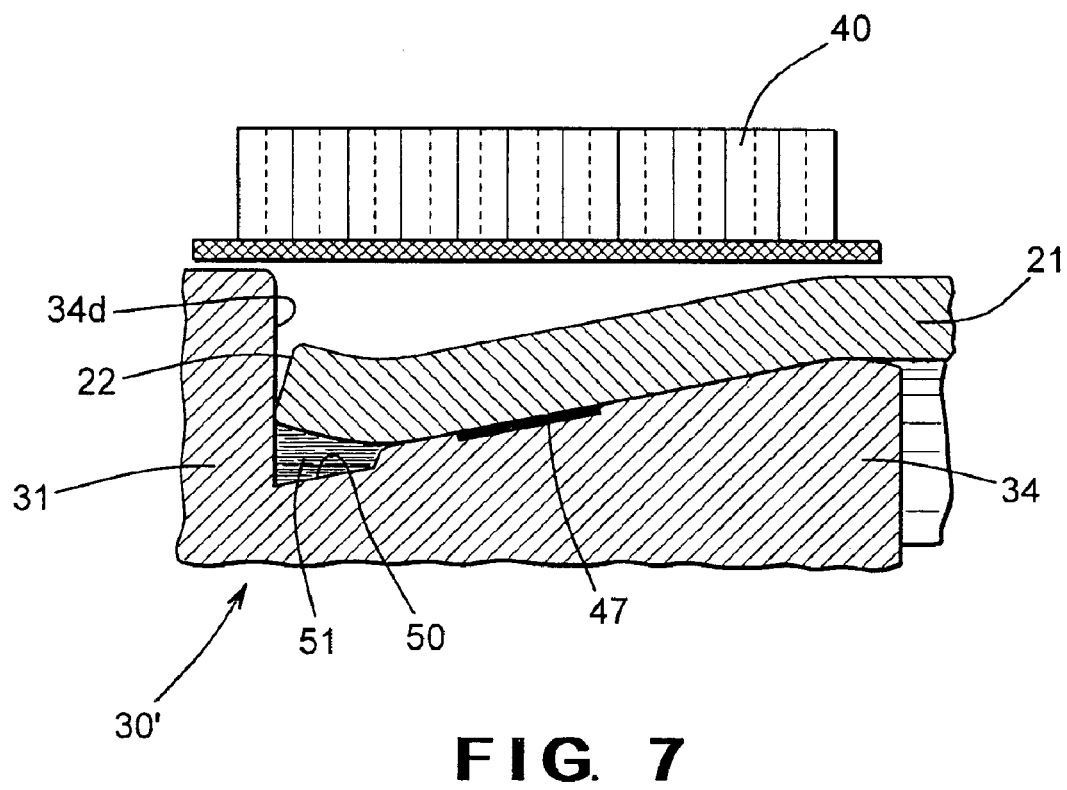
FIG. 7 is an enlarged sectional elevational view similar to FIG. 4 showing portions of the second embodiment of the end fitting, the driveshaft tube, and the inductor illustrated in FIG. 6 after the performance of a magnetic pulse welding operation in accordance with the method of this invention.

FIG. 7 illustrates the driveshaft tube 20 and the modified end fitting 30' after the inductor 40 has been energized in the manner described above to perform a magnetic pulse welding operation in accordance with the method of this invention so as to reduce or eliminate the generation of the high velocity secondary flow 48 shown in FIG. 4. As shown therein, the end surface 22 of the driveshaft tube 20 has been collapsed into engagement with a portion of the shoulder 34d of the end fitting 30', while the remainder of the end portion 21 of the driveshaft tube 20 has been collapsed into engagement with the outer surface of the neck portion 34 as described above. As a result, the air that was present in the gap 36 before the commencement of the magnetic pulse welding operation and the rest of the cumulative flow are captured, either partially or completely, in an annular space 51 defined between the inner surface of the end portion 21 of the driveshaft tube 20, the recess 50 formed in the outer surface of the neck portion 34 of the modified end fitting 30', and the shoulder 34*d* of the end fitting 30. As previously discussed, such contained air and the rest of the cumulative flow will not be rapidly expelled (or least not as rapidly expelled) from the annular space 51 and, therefore, will not damage the inductor 40 in the manner of the high velocity secondary flow 48 described above.

Figure 8:
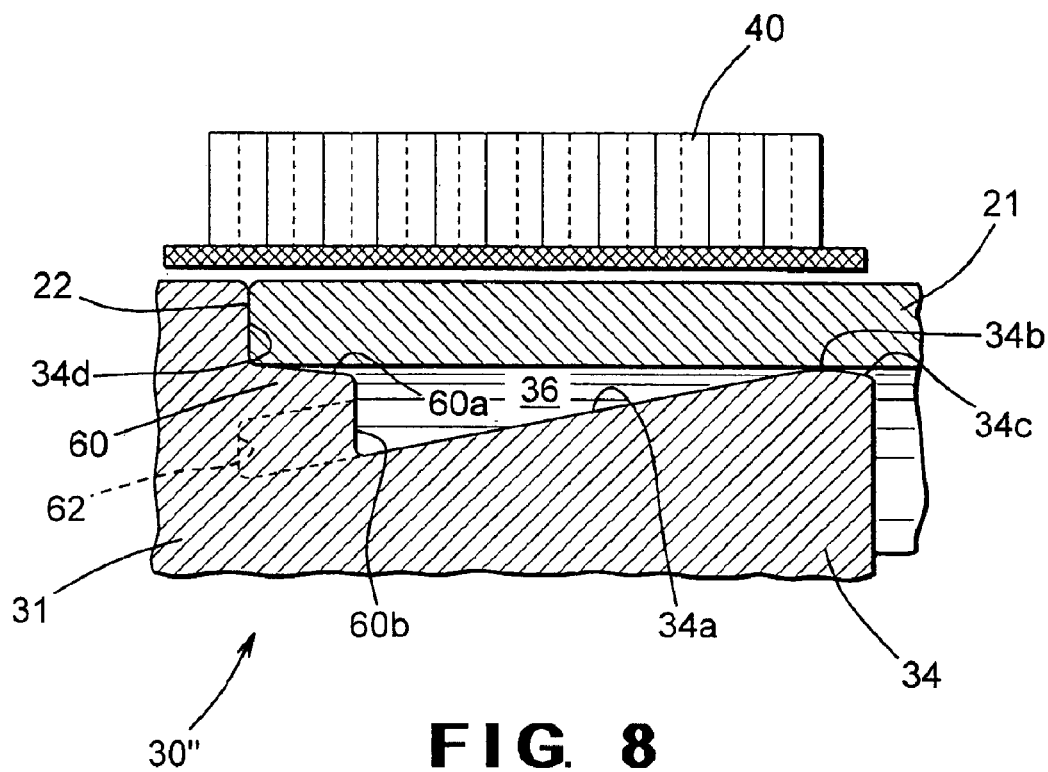
FIG. 8 is an enlarged sectional elevational view similar to FIG. 3 showing portions of a third embodiment of the end fitting, the driveshaft tube, and the inductor prior to the commencement of the magnetic pulse welding operation in accordance with the method of this invention.

FIG. 8 is an enlarged sectional elevational view similar to FIG. 3 showing a third embodiment of the end fitting, indicated generally at 30", that can be used in the method of this invention. The third embodiment of the end fitting 30" is generally similar to the first embodiment of the end fitting 30 described above, and like reference numbers are used to illustrate similar structures therein. However, the neck portion 34 of the modified end fitting 30" has an annular step 60 formed in the outer surface thereof. The illustrated step 60 has a generally radially outwardly facing surface 60*a* that is tapered slightly to facilitate the installation of the end portion 21 of the driveshaft tube 20 thereover and to positively position the end portion 21 of the driveshaft tube 20 on the neck portion 34 of the end fitting 30. To accomplish this, the generally radially outwardly facing surface 60*a* can be tapered at an angle in the range of from about five degrees to about nine degrees relative to the inner circumferential surface of the end portion 21 of the driveshaft tube 20, for example.

The illustrated step 60 also has a generally axially facing surface 60*b* that extends generally radially relative to an axis of rotation defined by the driveshaft tube 20 and the modified end fitting 30". In the illustrated embodiment, the step 60 is annular in shape, extending about the entire outer surface of the neck portion 34. However, the step 60 need not extend about the entire outer surface of the neck portion 34, but rather may extend about only a portion thereof. In the illustrated embodiment, the step 60 is formed in the outer surface of the neck portion 34 adjacent to the shoulder 34*d*. However, the step 60 may be formed at any desired location in the outer surface of the neck portion 34.

Figure 9:
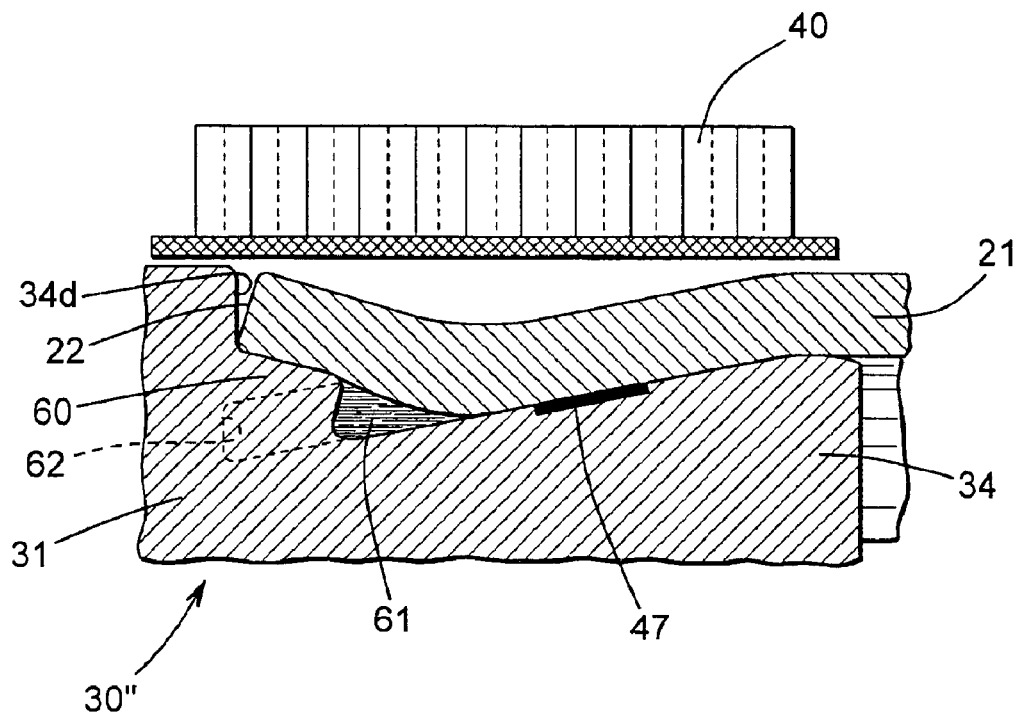
FIG. 9 is an enlarged sectional elevational view showing portions of the third embodiment of the end fitting, the driveshaft tube, and the inductor illustrated in FIG. 8 after the performance of the magnetic pulse welding operation in accordance with the method of this invention.

FIG. 9 illustrates the driveshaft tube 20 and the modified end fitting 30" after the inductor 40 has been energized in the manner described above to perform a magnetic pulse welding operation in accordance with the method of this invention so as to reduce or eliminate the generation of the high velocity secondary flow 48 shown in FIG. 4. As shown therein, the end surface 22 of the driveshaft tube 20 has been collapsed into engagement with the step 60 of the end fitting 30", while the remainder of the end portion 21 of the driveshaft tube 20 has been collapsed into engagement with the outer surface of the neck portion 34 as described above. During this operation, the step 60 may be somewhat deformed, as shown in FIG. 9. As a result, the air that was present in the gap 36 before the commencement of the magnetic pulse welding operation and the rest of the cumulative flow are captured, either partially or completely, in an annular space 61 defined between the inner surface of the end portion 21 of the driveshaft tube 20, the step 60, and the outer surface of the neck portion 34 of the modified end fitting 30". As previously discussed, such contained air and the rest of the cumulative flow will not be rapidly expelled from the annular space 61 and, therefore, will not damage to the inductor 40 in the manner of the high velocity secondary flow 48 described above.

The provision of the step 60 on the third embodiment of the end fitting 30" will typically provide for better containment of the air and the rest of the cumulative flow that were present in the gap 36 before the commencement of the magnetic pulse welding operation than the first and second embodiments of the end fitting 30 and 30' described above. However, because the end portion 21 of the driveshaft tube 20 initially abuts the radially outwardly facing surface 60*a* of the step 60 on the third embodiment of the end fitting 30" during the magnetic pulse welding operation (instead of being free to move radially inwardly as with the first and second embodiments of the end fitting 30 and 30' described above), it will be appreciated that the provision of this step 60 may require the use of additional electrical energy to insure that the interior portion of the inner surface of the driveshaft tube 20 abuts the outer surface of the modified end fitting 30" at a sufficient velocity as to complete the magnetic pulse welding operation.

To minimize the amount of additional electrical energy to perform the magnetic pulse welding operation, a groove (shown in phantom at 62 in FIGS. 8 and 9) can be formed in the step 60 on the third embodiment of the end fitting 30". The groove 62 can extend continuously about the circumference of the end fitting 30" or only partially thereabout. Furthermore, the groove 62 can be embodied as a plurality of discontinuous recesses formed about the circumference of the end fitting 30". The purpose of the groove 62 is to mechanically weaken the step 60, thereby allowing the step 60 to be more easily deformed when the magnetic pulse welding operation is performed. Such deformation will minimize the amount of additional electrical energy to perform the magnetic pulse welding operation, while still providing the step 60 for better containment of the air and cumulative flow in the annular space 61.

Figure 10:
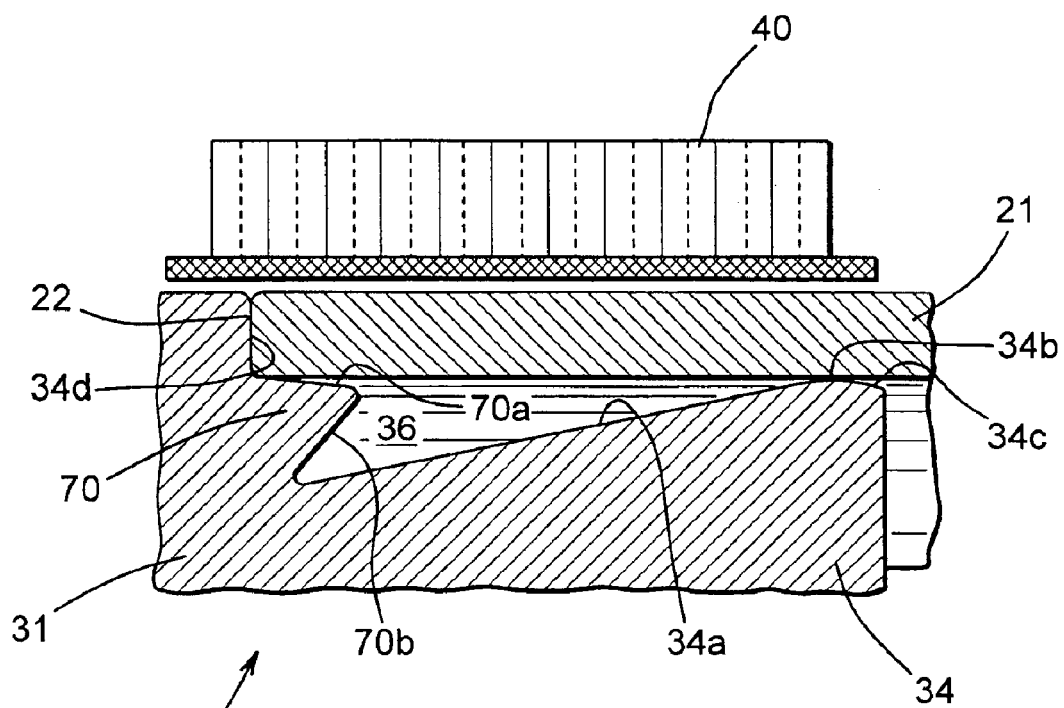
FIG. 10 is an enlarged sectional elevational view similar to FIG. 3 showing portions of a fourth embodiment of the end fitting, the driveshaft tube, and the inductor prior to the commencement of the magnetic pulse welding operation in accordance with this invention.

FIG. 10 is an enlarged sectional elevational view similar to FIG. 3 showing a fourth embodiment of the end fitting, indicated generally at 30''', that can be used in the method of this invention. The fourth embodiment of the end fitting 30''' is generally similar to the first embodiment of the end fitting 30 described above, and like reference numbers are used to illustrate similar structures therein. However, the neck portion 34 of the modified end fitting 30''' has a modified step 70 formed in the outer surface thereof. The modified step 70 has a generally radially outwardly facing surface 70*a* that is tapered slightly to facilitate the installation of the end portion 21 of the driveshaft tube 20 thereover, similar to the generally radially outwardly facing surface 60*a* described above. The modified step 70 also has a generally axially facing surface 70*b* that is angled somewhat concavely relative to an axis of rotation defined by the driveshaft tube 20 and the end fitting 30'''. For example, the generally axially facing surface 70*b* can be tapered at an angle in the range of from about thirty degrees to about sixty degrees relative to the axis of rotation defined by the driveshaft tube 20 and the modified end fitting 30'''. In the illustrated embodiment, the modified step 70 is annular in shape, extending about the entire outer surface of the neck portion 34 of the modified end fitting 30'''. However, the modified step 70 need not extend about the entire outer surface of the neck portion 34, but rather may extend about only a portion thereof.

Figure 11:
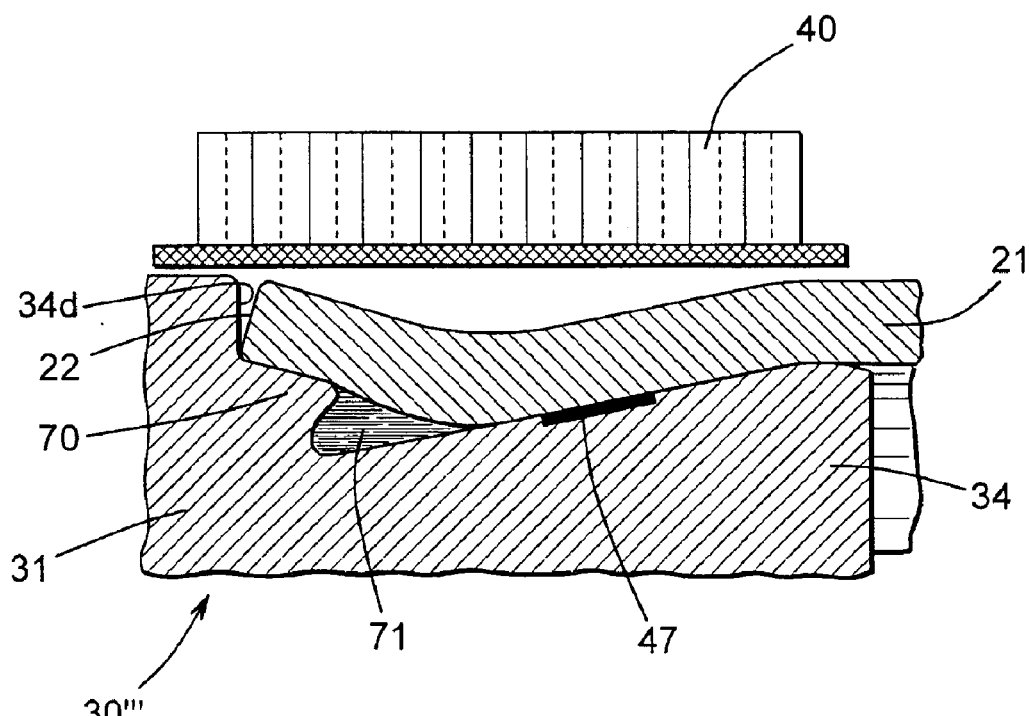
FIG. 11 is an enlarged sectional elevational view showing portions of the fourth embodiment of the end fitting, the driveshaft tube, and the inductor illustrated in FIG. 10 after the performance of the magnetic pulse welding operation in accordance with the method of this invention.

FIG. 11 illustrates the driveshaft tube 20 and the modified end fitting 30''' after the inductor 40 has been energized in the manner described above to perform a magnetic pulse welding operation in accordance with the method of this invention so as to reduce or eliminate the generation of the high velocity secondary flow 48. As shown therein, the end surface 22 of the driveshaft tube 20 has been collapsed into engagement with the modified step 70 of the end fitting 30''', while the remainder of the end portion 21 of the driveshaft tube 20 has been collapsed into engagement with the outer surface of the neck portion 34 as described above. During this operation, the modified step 70 may be somewhat deformed, as shown in FIG. 11. As a result, the air that was present in the gap 36 before the commencement of the magnetic pulse welding operation and the rest of the cumulative flow are captured, either partially or completely, in an annular space 71 defined between the inner surface of the end portion 21 of the driveshaft tube 20, the modified step 70, and the outer surface of the neck portion 34 of the modified end fitting 30'''. As previously discussed, such contained air and cumulative flow will not be rapidly expelled from the annular space 71 and, therefore, will not damage the inductor 40 in the manner of the high velocity secondary flow 48 described above.

Because of the concave shape of the modified step 70, the provision of a groove in the modified step 70 (such as the groove 62 in the step 60 described above and shown in FIGS. 8 and 9) may not be necessary or desirable. However, such a groove may be provided in the modified step 70 if desired.

Figure 12:
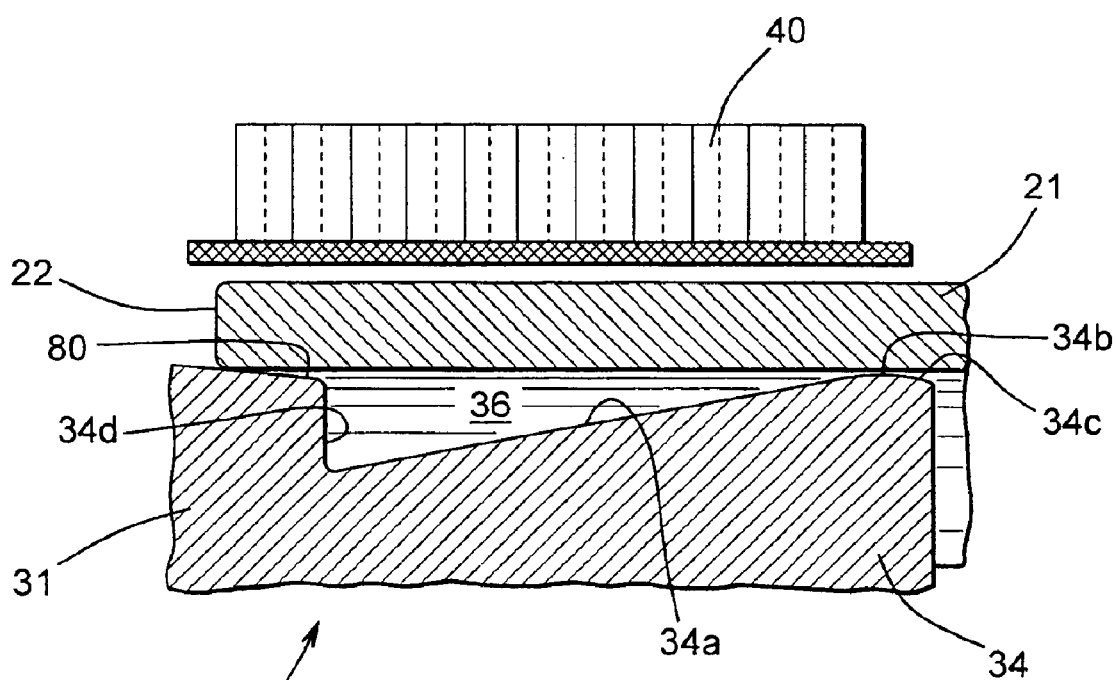
FIG. 12 is an enlarged sectional elevational view similar to FIG. 3 showing portions of a fifth embodiment of the end fitting, the driveshaft tube, and the inductor prior to the commencement of the magnetic pulse welding operation in accordance with this invention.

FIG. 12 is an enlarged sectional elevational view similar to FIG. 3 showing a fifth embodiment of the end fitting, indicated generally at 30'''', that can be used in the method of this invention. The fifth embodiment of the end fitting 30'''' is generally similar to the first embodiment of the end fitting 30 described above, and like reference numbers are used to illustrate similar structures therein. In this embodiment, however, the end portion 21 of the driveshaft tube 20 does not abut the annular shoulder 34d that is defined between the neck portion 34 and the body portion 31 of the end fitting 30, but rather extends axially beyond such annular shoulder 34d. To facilitate this, the outer surface of the body portion 31 of the end fitting 30 may have a generally radially outwardly facing surface 80 that is tapered slightly to facilitate the installation of the end portion 21 of the driveshaft tube 20 thereover. The generally radially outwardly facing surface 80 can be tapered at an angle in the range of from about five degrees to about nine degrees relative to the inner circumferential surface of the end portion 21 of the driveshaft tube 20, for example.

Figure 13:
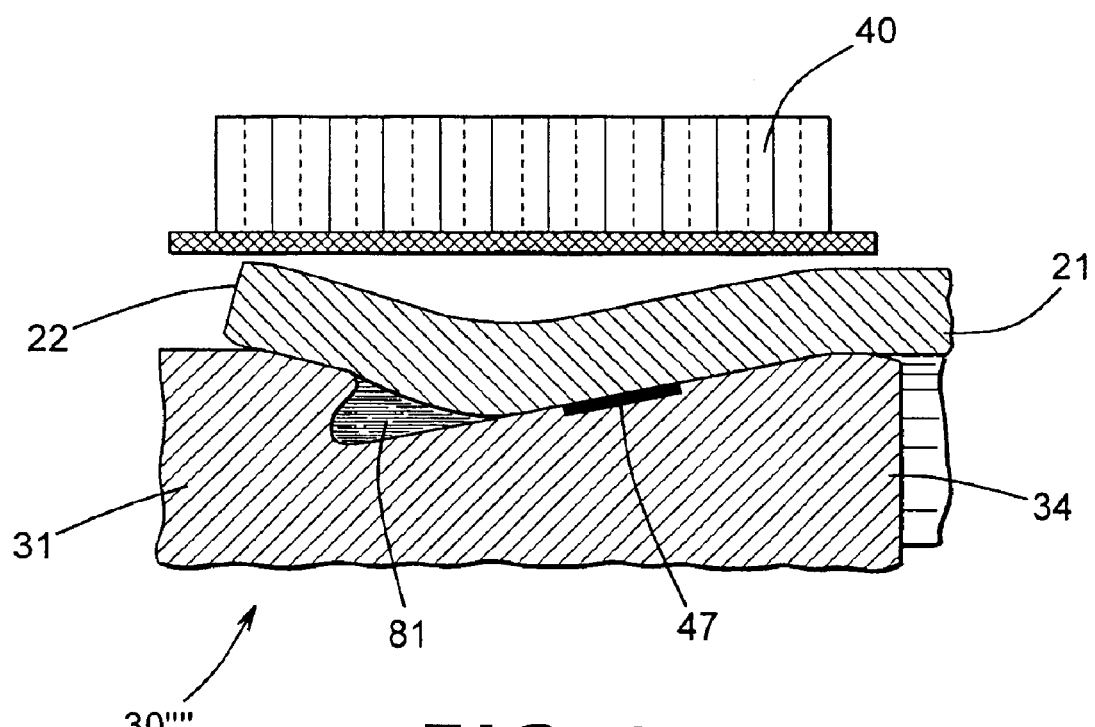
FIG. 13 is an enlarged sectional elevational view showing portions of the fifth embodiment of the end fitting, the driveshaft tube, and the inductor illustrated in FIG. 12 after the performance of the magnetic pulse welding operation in accordance with the method of this invention.

FIG. 13 illustrates the driveshaft tube 20 and the modified end fitting 30'''' after the inductor 40 has been energized in the manner described above to perform a magnetic pulse welding operation in accordance with the method of this invention so as to reduce or eliminate the generation of the high velocity secondary flow 48 shown in FIG. 4. As shown therein, the end portion 21 of the driveshaft tube 20 has been collapsed into engagement with the tapered outer surface 34a of the neck portion 34 as described above. During this operation, the annular shoulder 34d may be somewhat deformed, as shown in FIG. 13. As a result, the air that was present in the gap 36 before the commencement of the magnetic pulse welding operation and the rest of the cumulative flow are captured, either partially or completely, in an annular space 81 defined between the inner surface of the end portion 21 of the driveshaft tube 20, the annular shoulder 34d, and the outer surface of the neck portion 34 of the modified end fitting 30''''. As previously discussed, such contained air and the rest of the cumulative flow will not be rapidly expelled from the annular space 81 and, therefore, will not damage to the inductor 40 in the manner of the high velocity secondary flow 48 described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of performing a magnetic pulse welding operation to secure first and second metallic components together comprising the steps of:
   (a) providing a first metallic component including a first portion having a shoulder and a second portion;
   (b) providing a second metallic component having an end;
   (c) disposing the end of the second metallic component in an axially overlapping manner relative to the first portion of the first metallic component;
   (d) providing an inductor axially relative to the end of the second metallic component and the first portion of the first metallic component; and
   (e) energizing the inductor to perform a magnetic pulse welding operation to secure the end of the second metallic component to the first portion of the first metallic component and to cause the end of the second metallic component to engage the shoulder to prevent a significant flow of air toward the inductor.

2. The method defined in claim 1 wherein said step (c) is performed by disposing the end of the second metallic component in abutment with the shoulder provided on the first portion of the first metallic component.

3. The method defined in claim 1 wherein said step (c) is performed by disposing the end of the second metallic component axially beyond the shoulder provided on the first portion of the first metallic component.

4. The method defined in claim 3 wherein said step (a) is performed by providing the second portion of the first metallic component with a tapered surface, and wherein said step (c) is performed by disposing the end of the second metallic component in engagement with the tapered surface.

5. The method defined in claim 1 wherein said step (a) is performed by providing the first portion of the first metallic component with an outer surface having a recess, and wherein said step (e) is performed by causing the end of the second metallic component to engage the shoulder and a portion of the first metallic component to define a space that includes the recess.

6. The method defined in claim 1 wherein said step (a) is performed by providing a shoulder having a step, and wherein said step (e) is performed by causing the end of the second metallic component to engage the step of the shoulder and a portion of the first metallic component to define a space.

7. The method defined in claim 6 wherein said step (a) is performed by providing the step having a groove formed therein.

8. The method defined in claim 6 wherein said step (a) is performed by providing the step having a plurality of grooves formed therein.

9. The method defined in claim 6 wherein said step (a) is performed by providing the step having a generally axially facing surface that is angled relative to an axis of rotation defined by the first and second metallic components.

10. The method defined in claim 6 wherein said step (a) is performed by providing the step having a generally axially facing surface that is angled concavely relative to an axis of rotation defined by the first and second metallic components.

11. The method defined in claim 6 wherein said step (a) is performed by providing the step having a tapered surface, and wherein said step (c) is performed by disposing the end of the second metallic component in engagement with the tapered surface.

* * * * *